United States Patent
Kudo

(10) Patent No.: US 7,663,475 B2
(45) Date of Patent: Feb. 16, 2010

(54) VEHICLE SURROUNDING MONITORING SYSTEM

(75) Inventor: Shinya Kudo, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 413 days.

(21) Appl. No.: 11/527,534

(22) Filed: Sep. 27, 2006

(65) Prior Publication Data
US 2007/0069873 A1    Mar. 29, 2007

(30) Foreign Application Priority Data
Sep. 28, 2005    (JP) .............................. 2005-282664

(51) Int. Cl.
  *B60Q 1/26*    (2006.01)
  *B63G 8/20*    (2006.01)
  *G01S 5/14*    (2006.01)
(52) U.S. Cl. .................. 340/435; 340/436; 701/23; 342/357.14
(58) Field of Classification Search .................. 340/436
  See application file for complete search history.

(56) References Cited

U.S. PATENT DOCUMENTS

| | | | | |
|---|---|---|---|---|
| 5,410,346 A | * | 4/1995 | Saneyoshi et al. ........... | 348/116 |
| 5,680,313 A | * | 10/1997 | Whittaker et al. ........... | 701/300 |
| 5,774,392 A | * | 6/1998 | Kraus et al. ................. | 365/145 |
| 6,556,133 B2 | * | 4/2003 | Ogura ......................... | 340/435 |
| 2002/0001398 A1 | * | 1/2002 | Shimano et al. ............. | 382/104 |
| 2003/0067027 A1 | * | 4/2003 | Fox et al. .................... | 257/303 |
| 2003/0099377 A1 | * | 5/2003 | Hanawa ...................... | 382/104 |
| 2003/0138133 A1 | * | 7/2003 | Nagaoka et al. ............. | 382/104 |
| 2004/0125642 A1 | * | 7/2004 | Oikawa et al. .............. | 365/145 |
| 2004/0176900 A1 | * | 9/2004 | Yajima ........................ | 701/96 |
| 2005/0182551 A1 | * | 8/2005 | Sugano ........................ | 701/96 |

FOREIGN PATENT DOCUMENTS

JP    2004-034917    2/2004

\* cited by examiner

*Primary Examiner*—Daniel Wu
*Assistant Examiner*—Pameshanand Mahase
(74) *Attorney, Agent, or Firm*—Smith, Gambrell & Russell, LLP

(57) ABSTRACT a vehicle surrounding monitoring system including a vehicle travel information detecting unit for detecting travel information of an own vehicle, a solid object recognizing unit for detecting solid objects existing in front of the own vehicle and recognizing at least a preceding vehicle from the solid objects, a target route calculating unit for calculating a target route for the own vehicle in accordance with the present position of the preceding vehicle and the present position of the own vehicle, an alarm area setting unit for setting an alarm area on the basis of the target route, and an alarm control unit for giving an alarm in accordance with an existing state of solid objects existing in the alarm area.

10 Claims, 6 Drawing Sheets

VEHICLE SURROUNDING MONITORING SYSTEM

CROSS REFERENCE TO RELATED APPLICATIONS

The disclosure of Japanese Application No. 2005-282664 filed on Sep. 28, 2005 including the specification, drawings, and abstract is incorporated herein by reference in its entirety.

BACKGROUND OF THE INVENTION

1. Field of the Invention

The present invention relates to a vehicle surrounding monitoring system that accurately extracts an obstacle from solid objects in front of the vehicle and provides the driver with information about a steering direction.

Recently vehicles have been developed and put into practical use in which a travel environment in front of a vehicle is detected by an in-vehicle mounted camera or the like, and various control operations such as a follow-up travel control operation of following up a preceding vehicle, a travel control operation of keeping the inter-vehicle distance to the preceding vehicle to a fixed value or more, and an alarm control operation for obstacles existing in front of the vehicle are carried out on the basis of the travel environment data.

2. Description of Related Art

For example, JP-A-2004-34917 discloses a vehicle equipped with a preceding vehicle follow-up control system. Specifically, the preceding vehicle follow-up control system controls the vehicle in which the preceding vehicle follow-up control system itself is mounted (hereinafter referred to as "own vehicle") so that the own vehicle tracks a preceding vehicle traveling in front of the own vehicle. Preceding vehicles which travel in front of the own vehicle are detected, a follow-up preceding vehicle which is being followed up at present as a follow-up control target by the own vehicle is specified, and follow-up candidate vehicles which are vehicles other than the follow-up preceding vehicle as the present control target and also will potentially become follow-up control targets in the future are specified on the basis of a predetermined area set in front of the own vehicle.

The predetermined area for specifying a preceding vehicle in the above publication is set by offsetting a specific width in the lateral direction of the own vehicle on the basis of a yaw rate occurring in the own vehicle. However, with respect to the setting of the predetermined area as described above, the predetermined area is changed after the own vehicle starts to turn. Therefore, when a preceding vehicle is specified or an alarm is given by using this predetermined area, the control timing is delayed and thus the control precision is lowered.

SUMMARY OF THE INVENTION

The present invention has been implemented in view of the foregoing situation, and has an object to provide a vehicle surrounding monitoring system that can accurately set a control area in front of an own vehicle with excellent timing and perform alarm control with high precision.

According to the present invention, there is provided a vehicle surrounding monitoring system comprised of a vehicle travel information detecting unit for detecting travel information of an own vehicle, a solid object recognizing unit for detecting solid objects existing in front of the own vehicle and recognizing at least a preceding vehicle from the solid objects, a target route calculating unit for calculating a target route for the own vehicle in accordance with the present position of the preceding vehicle and the present position of the own vehicle, an alarm area setting unit for setting an alarm area on the basis of the target route, and an alarm control unit for giving an alarm in accordance with an existing state of solid objects existing in the alarm area.

According to the vehicle surrounding monitoring system of the present invention, the control area to be set in front of the own vehicle can be set accurately with excellent timing, and the alarm control can be performed with high precision.

DESCRIPTION OF THE PREFERRED EMBODIMENT

A preferred embodiment according to the present invention will be described hereunder with reference to the accompanying drawings.

Figure 1:
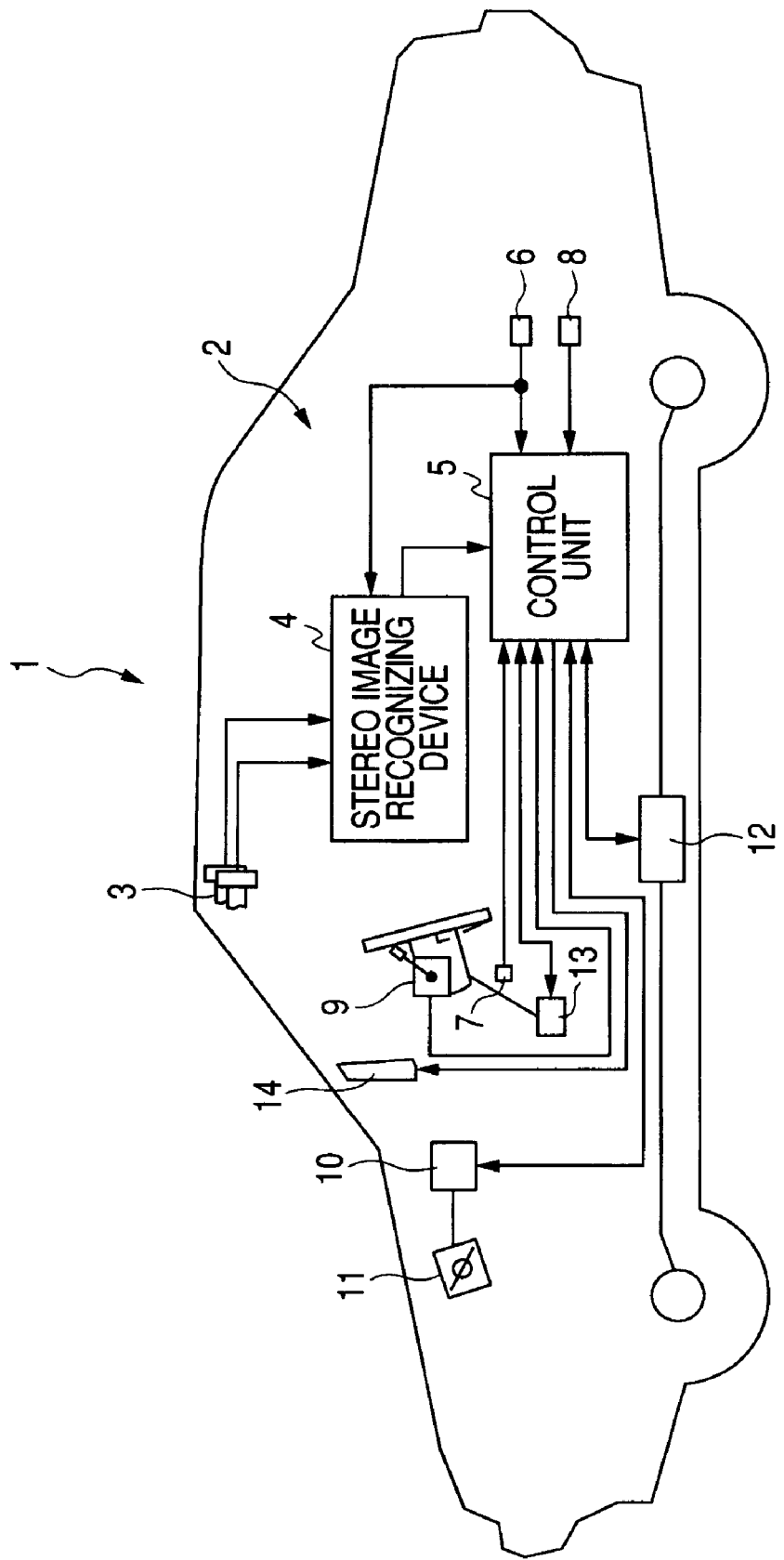
FIG. 1 is a diagram showing the construction of a vehicle surrounding monitoring system mounted on a vehicle.
Figure 2:
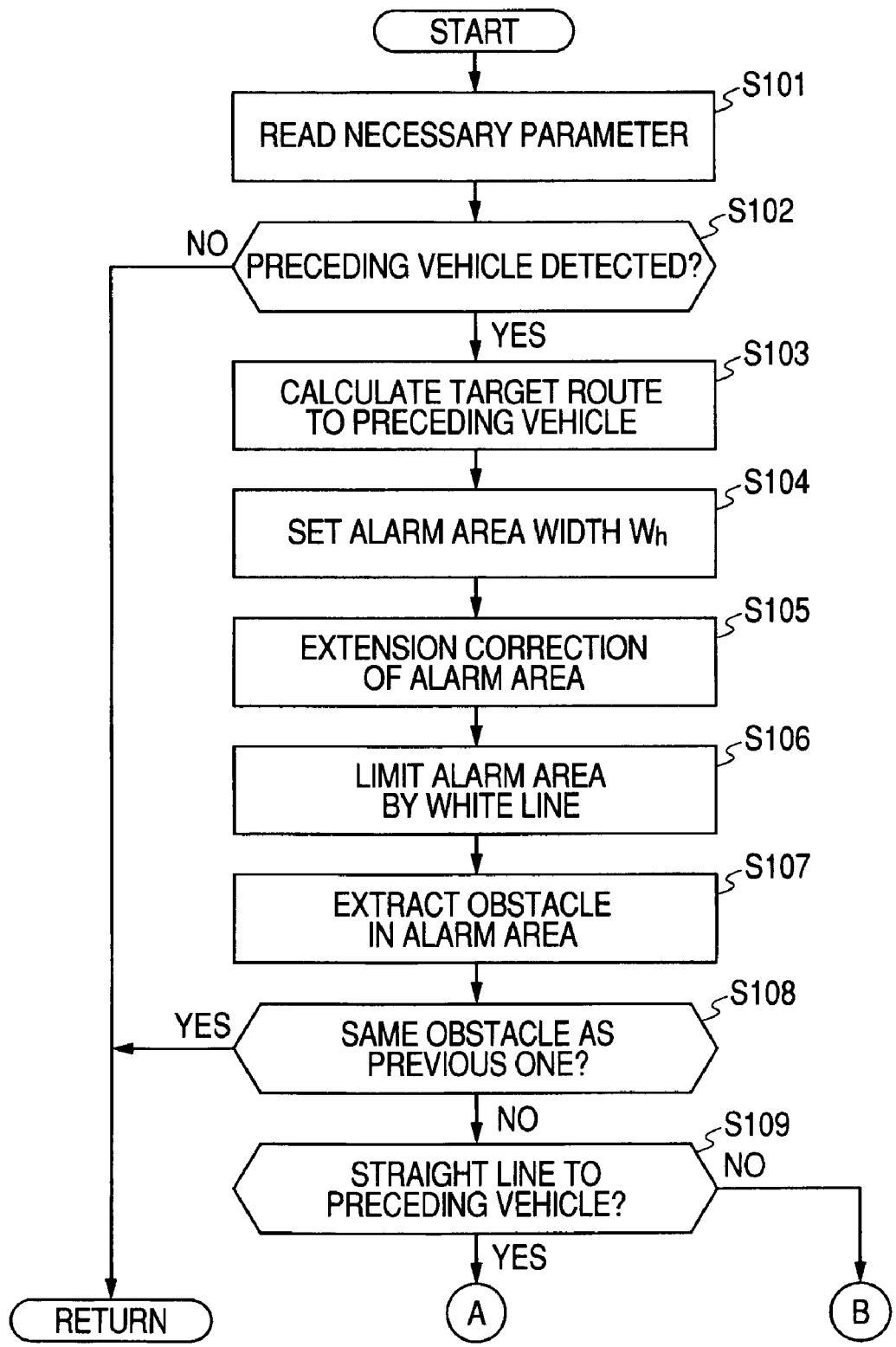
FIG. 2 is a flowchart showing an alarm control program.
Figure 3:
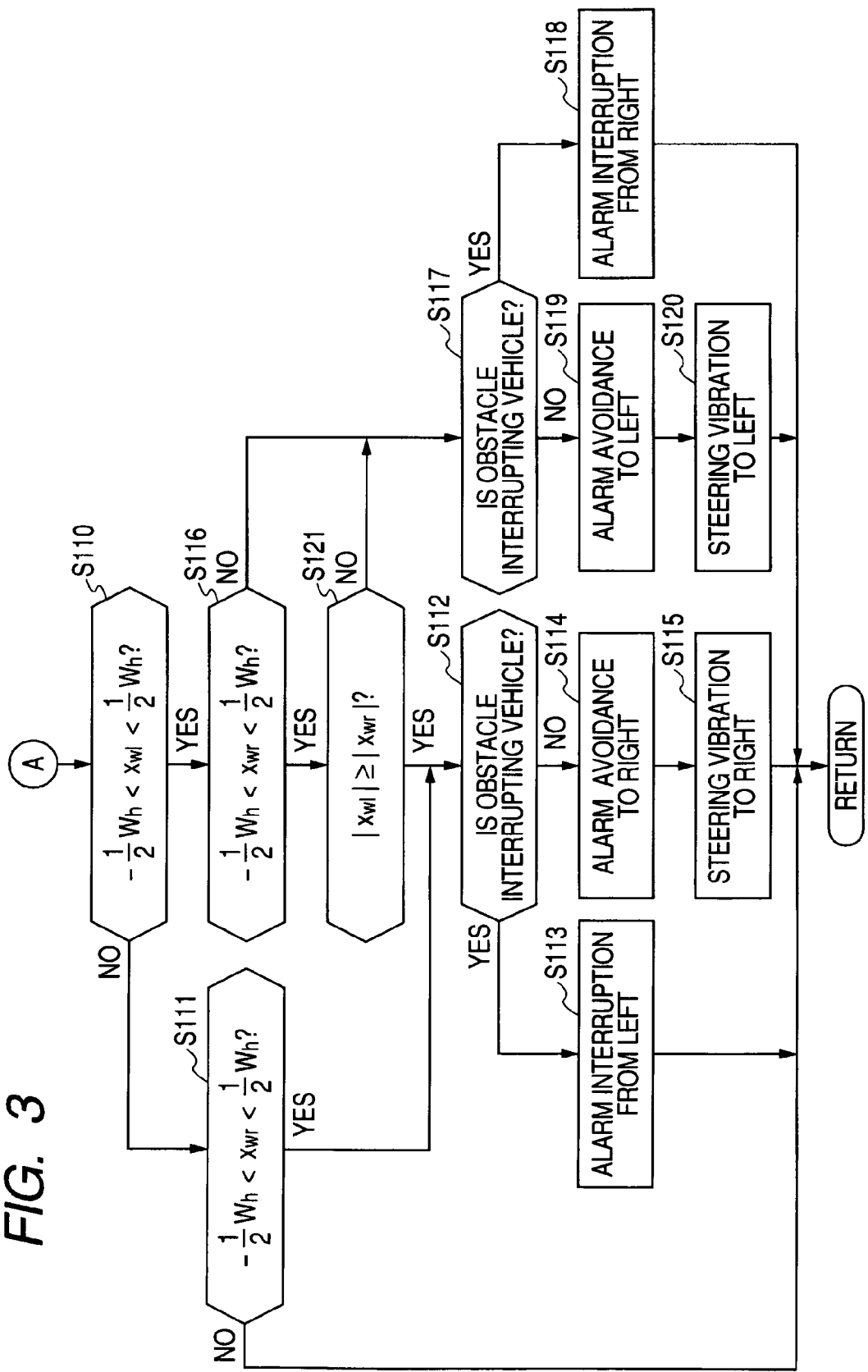
FIG. 3 is a flowchart subsequent to FIG. 2.
Figure 4:
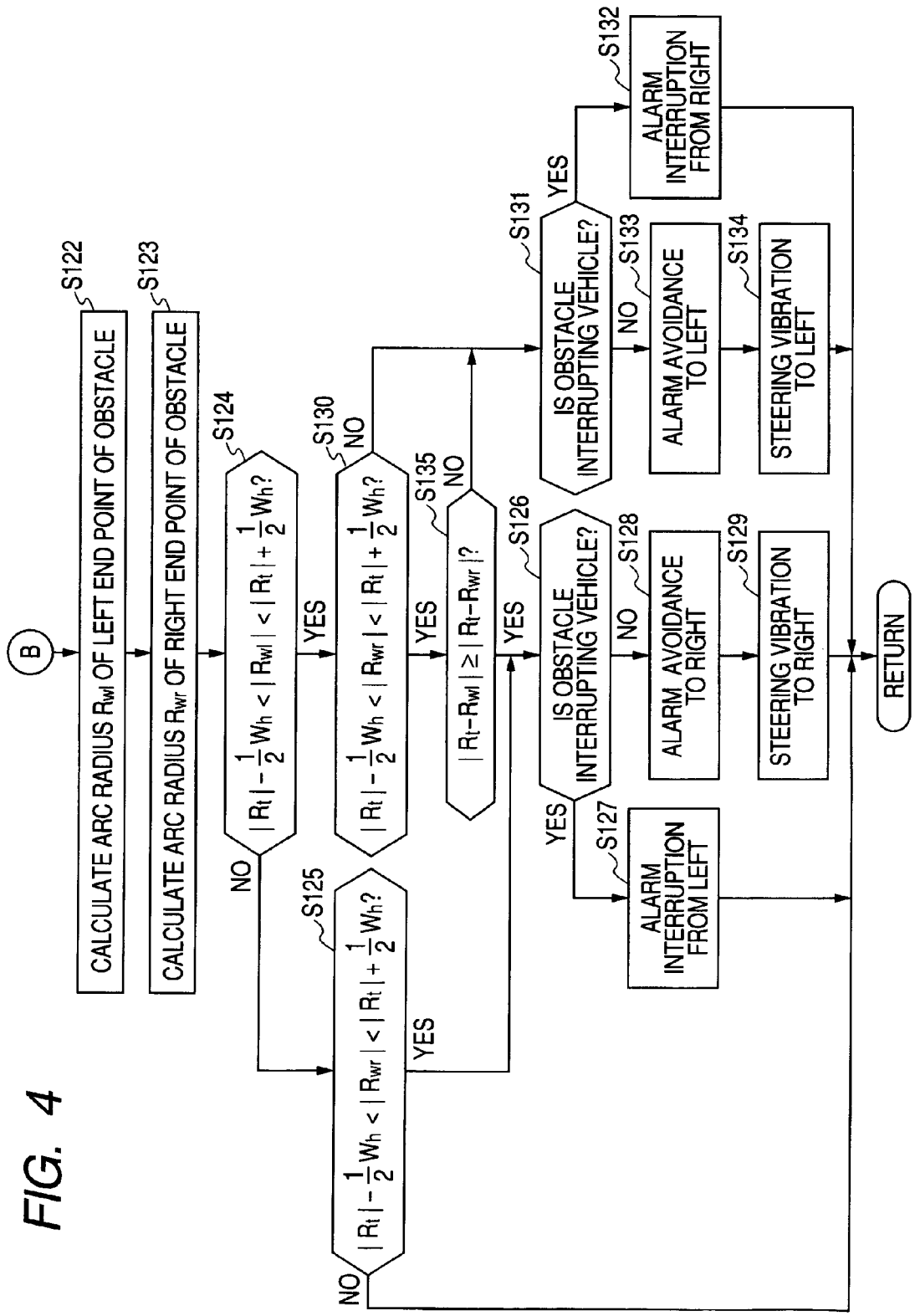
FIG. 4 is a flowchart subsequent to FIG. 2.
Figure 5:
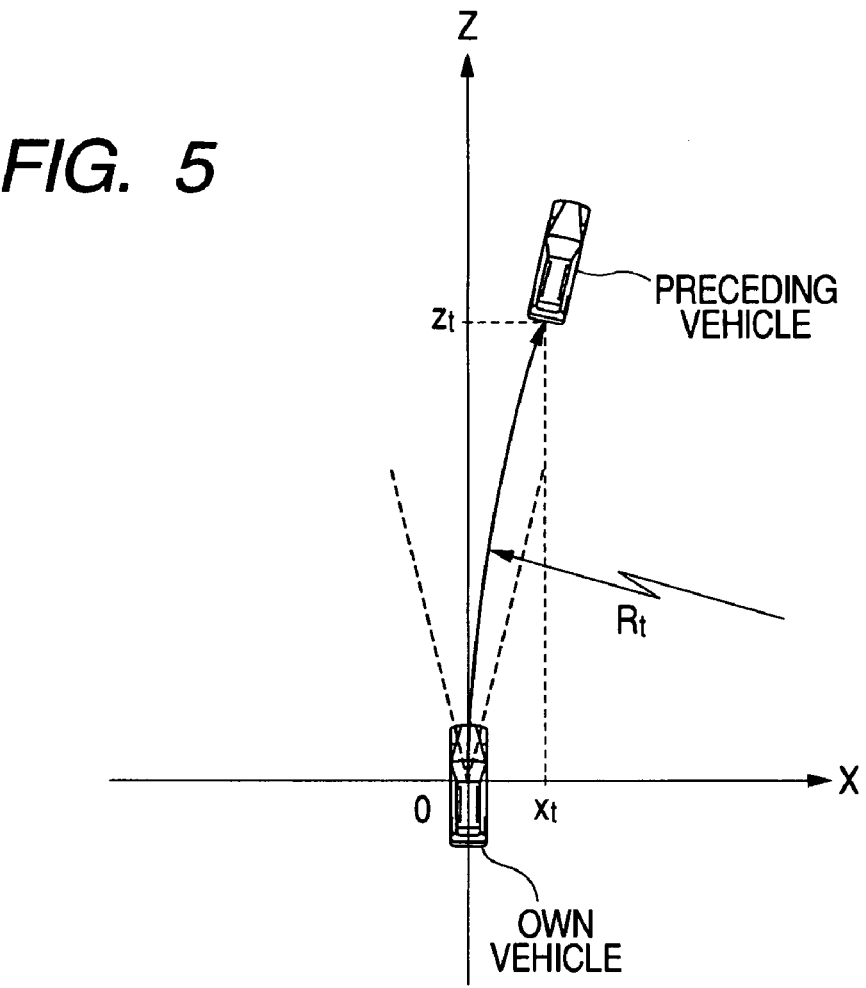
FIG. 5 is a diagram showing the relationship in coordinate position between an own vehicle and a preceding vehicle.
Figure 6:
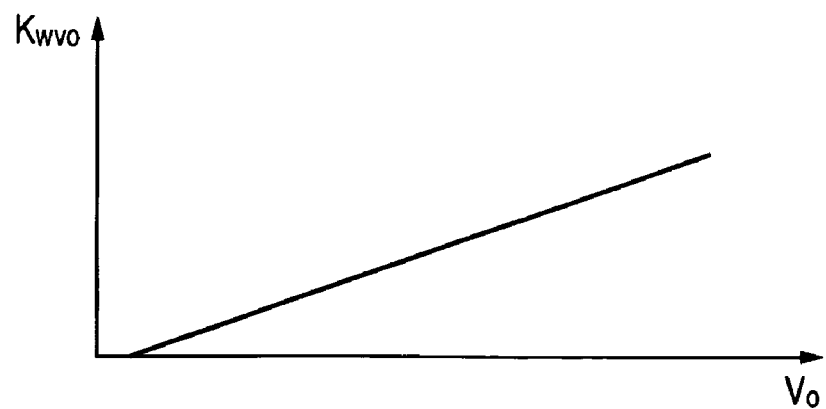
FIG. 6 is a characteristic diagram of an alarm area width correcting coefficient based on the speed of the own vehicle.

FIGS. 1 to 7 show an embodiment of the present invention. Specifically, FIG. 1 is a diagram showing the construction of a vehicle surrounding monitoring system mounted on a vehicle, FIG. 2 is a flowchart showing an alarm control program, FIG. 3 is a flowchart subsequent to FIG. 2, FIG. 4 is a flowchart subsequent to FIG. 2, FIG. 5 is a diagram showing the relationship in coordinate position between an own vehicle and a preceding vehicle, FIG. 6 is a characteristic diagram of an alarm area width correcting coefficient based on the speed of the own vehicle, and FIG. 7 is a diagram showing the relationship between an alarm area and an obstacle position.

In FIG. 1, reference numeral 1 represents a vehicle (own vehicle) such as a car, and the vehicle 1 is equipped with a cruise control system (ACC (Adaptive Cruise Control) system) 2 having an alarm function to obstacles existing in front of the own vehicle.

The ACC system 2 is mainly constructed by a stereo camera 3, a stereo image recognizing device 4, a control unit 5, etc. According to the ACC system 2, under a constant speed travel control state under which no preceding vehicle exists basically, the own vehicle travels under the state that the own vehicle speed set by the driver is kept. When a preceding vehicle exists, an automatic follow-up control operation based on follow-up acceleration/deceleration control and follow-up steering control is executed. Furthermore, when some obstacle exists in front of the own vehicle as described later, an alarm is executed.

The own vehicle 1 is equipped with, as a vehicle travel information detecting unit, a own vehicle speed sensor 6 for detecting the speed V0 of the own vehicle, a steering angle sensor 7 for detecting a steering angle θH and a yaw rate sensor 8 for detecting a yaw rate γr. The own vehicle speed V0 is input to the stereo image recognizing device 4 and the control unit 5, and the steering angle θH and the yaw rate γr are input to the control unit 5. Furthermore, an ON-OFF signal of a brake pedal is input from a brake switch (not shown) to the control unit 5.

The control unit 5 is also supplied with signals from various kinds of switches of a constant speed travel switch 9 which is constructed by plural switch groups and connected to a constant speed travel operation lever provided to the side portion of a steering column or the like. The constant speed travel switch 9 is constructed by a own vehicle speed set switch for setting a target own vehicle speed at the constant speed travel time, a coast switch for mainly changing and setting the target own vehicle speed so that the target own vehicle speed is reduced, a resume switch for mainly changing and setting the target own vehicle speed so that the target own vehicle speed is increased, etc. Furthermore, a main switch (not shown) for turning ON/OFF the constant speed travel control and the automatic follow-up control is provided in the neighborhood of the constant speed travel operation lever.

The stereo camera 3 is constructed by a pair of (right and left) CCD cameras using a solid-state image pickup device such as a charge-coupled device (CCD) as a stereo optical system. These right and left CCD cameras are secured to the front side of the ceiling in the vehicle so as to be spaced from each other at a fixed interval. These cameras pickup stereo images of a target out of the vehicle from different view points and output the image data to the stereo image recognizing device 4.

The stereo image recognizing device 4 is supplied with the image data from the stereo camera 3 and the own vehicle speed V0 from the vehicle speed sensor 6, and detects forward information (information on the front side of the own vehicle) of solid object data and white line data in front of the own vehicle 1 on the basis of the image data from the stereo camera 3 to estimate a travel road of the own vehicle 1 (own vehicle travel road). Then, a preceding vehicle in front of the own vehicle 1 is extracted, and the respective data of a preceding vehicle position (for example, the coordinate position on the X-Z coordinate system with the position of the own vehicle 1 as an origin as shown in FIG. 5), a preceding vehicle distance (the inter-vehicle distance; the distance between the own vehicle and the preceding vehicle), a preceding vehicle speed ((the variation amount of the inter-vehicle distance)+(own vehicle speed)), a preceding vehicle acceleration (the differential value of the preceding vehicle speed), information of solid objects other than the preceding vehicle (the position information of the left end point and the right end point of the rear face, an X-axis direction speed (the variation amount of the X-axis direction position), a Z-axis direction speed (the variation amount of the distance from the own vehicle 1) or the like), a white line coordinate, a white line recognizing distance, an own vehicle travel road coordinate, etc. are output to the control unit 5.

Here, the processing of the image data from the stereo camera 3 is executed in the stereo image recognizing device 4 as follows.

First, by using a pair of stereo images of an environment in the travel direction of the own vehicle 1 which are picked up by the CCD cameras of the stereo camera 3, the distance information is achieved from the displacement amount between the corresponding positions of the stereo images on the basis of the principle of triangular surveying. On the basis of this data, well-known grouping processing is carried out and the comparison with three-dimensional road shape data, solid object data, etc. which are stored in advance is carried out, thereby extracting while line data, side wall data of guard rails, curbstones, etc. existing along roads, and solid object data of vehicles, other obstacles, etc.

With respect to the solid object data, the distance to the solid object and the time variation of the distance (the relative speed to the own vehicle 1) are determined. Particularly, a vehicle which is nearest to the own vehicle on the own vehicle travel road and travels substantially in the same direction as the own vehicle 1 at a predetermined speed (for example, 0 km/h or more) is extracted as a preceding vehicle. When the speed of the preceding vehicle is substantially equal to 0 km/h, the preceding vehicle is recognized as a stopped preceding vehicle. Furthermore, with respect to the solid object information and the preceding vehicle information, the position information of the left end point and the right end point of the rear face is stored, and also substantially the center position between the left end point and the right end point of the rear face is stored as the center-of-gravity position of the solid object or the preceding vehicle. As described above, the stereo camera 3 and the stereo image recognizing device 4 are provided with function as a solid object recognizing unit.

The control unit 5 has a constant speed travel control function of performing constant speed travel control so as to keep the travel speed set by a driver's operation input and an automatic follow-up control (follow-up acceleration/deceleration control and follow-up steering control) function. When the driver turns on the main switch (not shown) and sets a desired vehicle speed by the constant speed travel operation lever, the signal from the constant speed travel switch 9 is input to the control unit 5. Then, a signal is output to a throttle valve control device 10 to subject the opening degree of the throttle valve 11 to feedback control so that the vehicle speed detected by the vehicle speed sensor 6 is converged to the vehicle speed set by the driver, whereby the own vehicle 1 is automatically set to the constant speed state, or a deceleration signal is output to an automatic brake control device 12 to actuate automatic brake.

Furthermore, when the control unit 5 recognizes a preceding vehicle through the stereo image recognizing device 4 under the constant speed travel control, the control operation is automatically switched to automatic follow-up control described later. The constant speed travel control function and the automatic follow-up control function are released when the driver steps on the brake, when the own vehicle speed exceeds a predetermined upper limit value or when the main switch is turned off.

When the vehicle travel control is shifted to the follow-up travel control, for example, a target inter-vehicle time is calculated and set on the basis of the own vehicle speed, and a target acceleration is calculated on the basis of the inter-vehicle distance to the preceding vehicle, the preceding vehicle speed, the own vehicle speed and the target inter-vehicle time. Then, a signal is output to the throttle valve control device 10 to subject the opening degree of the throttle valve 11 to feedback control or a deceleration signal is output to the automatic brake control device 12 to actuate the automatic brake, thereby performing follow-up travel (containing follow-up stop, follow-up start) (follow-up acceleration/deceleration control).

Furthermore, when the vehicle travel control is shifted to the follow-up travel control and the preceding vehicle turns or changes the travel direction thereof, the vehicle travel control is shifted to the follow-up steering control. For example when the own vehicle speed V0 is in a high-speed side vehicle speed area of a follow-up steering control vehicle speed range of, for example, less than 35 km/h, the target yaw rate of the own vehicle is calculated in accordance with the present positions of the preceding vehicle and the own vehicle, and a power steering indicating current value for following the preceding vehicle is calculated on the basis of the target yaw rate concerned and output to an electrically-driven power steering control device 13. When the own vehicle speed V0 is in a low-speed side vehicle speed area within the vehicle speed range concerned, the target steering angle of the own vehicle is calculated in accordance with the present positions of the preceding vehicle and the own vehicle, and a power steering indicating current value for following the preceding vehicle is calculated on the basis of the target steering angle and output to the electrically-driven power steering control device 13.

Furthermore, the control unit 5 executes the alarm control according to the flowcharts of FIGS. 2 to 4 described later, and carries out an alarm on a liquid crystal monitor 14 for displaying each operation state of the ACC system 2 as occasion demands. The alarming object is not limited to the liquid crystal monitor 14, but an alarm may be carried out on a combination meter panel or with a voice output.

The alarm control is based on the operation that when the preceding vehicle exists, the target route of the own vehicle 1 is calculated in accordance with the present positions of the preceding vehicle and the own vehicle 1, the alarm area is set on the basis of the target route, and the alarm is carried out in accordance with the existence state of the object solid existing in the alarm area. That is, the control unit 5 is equipped with the alarm control, so that it is constructed to function as the target route calculating unit, the alarm area setting unit and the alarm control unit.

Next, the alarm control will be described with reference to the flowcharts of FIGS. 2 to 4. The follow-up steering control program is executed every predetermined time when the mains witch of the ACC system 2 is turned on, and necessary parameters are first read in step (hereinafter abbreviated to "S") 101.

Subsequently, the processing goes to S102 to judge whether a preceding vehicle is detected or not. If no preceding vehicle is detected, the processing directly drops out of the program. If a preceding vehicle is detected, the processing goes to S103.

In S103, a target route to the preceding vehicle is calculated and set in accordance with the center-of-gravity coordinate (xt, zt) of the preceding vehicle. That is, when xt is equal to 0, the target route is set to a straight line route from the origin O of the own vehicle (set to the center-of-gravity position of the own vehicle or the secured position of the sensor) to the center-of-gravity coordinate (xt, zt) of the preceding vehicle (see FIG. 7A). When xt is not equal to zero, the target route to the center-of-gravity coordinate (xt, zt) of the preceding vehicle is calculated and set by approximating the target route concerned with an arc having a radius Rt according to the following equation (1) (see FIG. 7B):

$$Rt=(xt^2+zt^2)/(2\cdot xt) \quad (1)$$

In this embodiment, as a calculation result of the equation (1), even when the radius Rt is large (for example, Rt≧300 m), the target route is set to a straight line route from the origin O of the own vehicle to the center-of-gravity (xt, zt) of the preceding vehicle as in the case of xt=0.

Subsequently, the processing goes to S104, and the width Wh of the alarm area is set according to the following equation (2):

$$Wh=Wh0+Kwv0+Kw1+Kwvfx+Kwvf0 \quad (2)$$

Here, Wh0 represents a preset basic value of the alarm area width Wh, Kwv0 represents a correction value set in accordance with the own vehicle speed V0, Kw1 represents a correction value set in accordance with the inter-vehicle distance L between the own vehicle and the preceding vehicle, Kwvfx represents a correction value set in accordance with the speed at which a solid object as a judgment target approaches to the alarm area, and Kwvf0 represents a correction value set in accordance with the relative speed between the preceding vehicle and the own vehicle.

The correction value Kwv0 set in accordance with the own vehicle speed V0 is set to be broader as the own vehicle speed V0 is higher, for example, as shown in FIG. 6. As the own vehicle speed V0 is higher, an obstacle is detected at an earlier stage, and a proper alarm is given.

The correction value Kw1 set in accordance with the in-vehicle distance L between the own vehicle and the preceding vehicle is also set to be broader as the in-vehicle distance L between the own vehicle and the preceding vehicle is longer as in the case of the correction value Kwv0, and this is set in consideration of such a situation that as the in-vehicle distance L is longer, an obstacle invades into the alarm area more easily.

The correction value Kwvfx set in accordance with the speed at which a solid object as a judgment target approaches to the alarm area is also set to be broader as the approach speed of the solid object as a judgment target to the alarm area is higher as in the case of the correction value Kwv0. Even a solid object which is normally judged as being out of the alarm area can be properly judged as being within the alarm area and thus an effective alarm is given.

The correction value Kwvf0 set in accordance with the relative speed between the preceding vehicle and the own vehicle is also set to be broader as the relative speed between the preceding vehicle and the own vehicle is higher (as the inter-vehicle distance L is longer) as in the case of the correction value Kwv0. This pays attention to a situation that when the relative speed between the preceding vehicle and the own vehicle is higher, an obstacle invades into the alarm area.

In this embodiment, all the corrections of Kwv0, Kw1, Kwvfx and Kwvf0 are executed. However, the present invention is not limited to this embodiment, and none of the corrections or any one of the corrections or any two corrections or any three corrections may be adopted.

Subsequently, the processing goes to S105 to execute an extension correction of the alarm area. This extension corresponds to Whdz in FIG. 7A or FIG. 7B. Whdz is set so that as the own vehicle speed V0 is higher, the extension area is lengthened and thus an alarm for a farther front side (for example, pedestrians, etc. at the lateral side of the preceding vehicle or in front of the preceding vehicle are set as alarm targets) is executed. Whdz is not necessarily variable in accordance with the own vehicle as described above, however, it may be set to a preset fixed value (for example, an area of about 2 to 3 m in front of the preceding vehicle), or the area may not be extended by Whdz.

Subsequently, the processing goes to S106 to execute restriction of the alarm area by a white line. That is, when a white line of a travel road exists in the alarm area, the alarm area is restricted by this white line.

Subsequently, the processing goes to S107, and a solid object existing in the set alarm area is extracted as an obstacle. When plural solid objects exist in the alarm area, a solid object which is nearest to the own vehicle 1, that is, a solid object having the smallest Z coordinate zw1 (or zwr or the center-of-gravity position) is extracted as an obstacle. When no solid object is detected in the alarm area and there is no target obstacle, preset data for making it possible to surely identify the above situation are set (for example, the X coordinate and Z coordinate of the left end point and the right end point are set to 9999 or the like).

Then, the processing goes to S108 to judge whether the obstacle extracted in S107 is the same obstacle as previously extracted. If it is judged that the obstacle concerned is identical to the previous obstacle, the alarm control for this obstacle has been already carried out and checked, and thus the processing directly drops out of the program.

Conversely, if the obstacle concerned is not identical to the previous obstacle, and but anew obstacle, the processing goes to S109 to judge whether the target route to the preceding vehicle set in S103 is a straight line road or a road approximated by an arc.

Figure 7A:
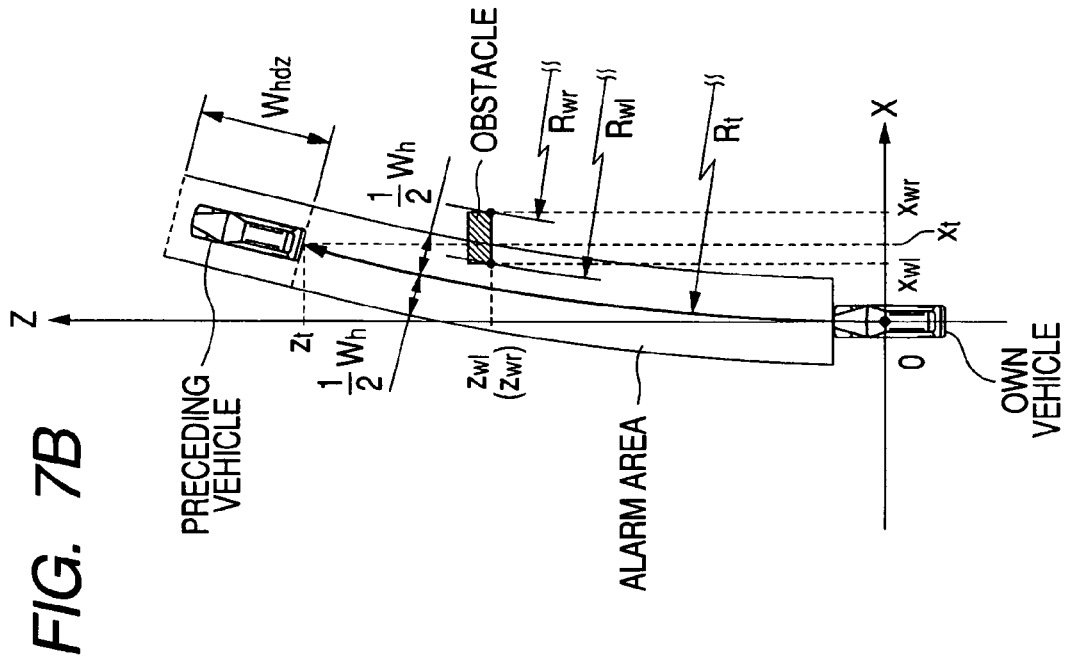
FIGS. 7A and 7B are diagrams showing the relationship between an alarm area and an obstacle position.

If as a result of the judgment of S109, the target route is a straight line road as shown in FIG. 7A, the processing goes to S110, and it is judged whether the X coordinate xw1 of the left end point of the obstacle exists within the alarm area, that is, whether it is satisfied that $-(\frac{1}{2})\cdot Wh < xw1 < (\frac{1}{2})\cdot Wh$.

If as a result of this judgment the X coordinate xw1 of the left end point of the obstacle does not exist within the alarm area, the processing goes to S111 to judge whether the X coordinate xwr of the right end point of the obstacle exists within the alarm area, that is, whether it is satisfied that $-(\frac{1}{2})\cdot Wh < xwr < (\frac{1}{2})\cdot Wh$.

If as a result of this judgment of S111 the X coordinate xwr of the right end point of the obstacle does not exist within the alarm area, the processing directly drops out of the program.

If as a result of the judgment of S111 the X coordinate xwr of the right end point of the obstacle exists within the alarm area, the processing goes to S112 to judge whether this obstacle is an interrupting vehicle. Here, with respect to the judgment of the interrupting vehicle, if the Z direction speed of an obstacle is substantially identical to the speed of the preceding vehicle (for example, speed of ±10%) and the width between the left end point and the right end point has a width regarded as being substantially identical to the width of a vehicle (for example, 2 m), the obstacle is judged as an interrupting vehicle.

If as a judgment result of S112 the obstacle is judged as an interrupting vehicle, the processing goes to S113, it is informed on the liquid crystal monitor 14 that there is an interrupting vehicle from the left (for example, a display indicating invasion of a vehicle from the left side is turned on and off), or a voice message of "keep your attention to interrupting vehicle from left" or the like is generated, and then the processing drops out of the program.

Furthermore, if as a result of the judgment of S112 the obstacle is judged not to be an interrupting vehicle, the processing goes to S114 to give an alarm by making a display indicating "turning of the steering to the right" on the liquid crystal monitor 14.

Thereafter, the processing goes to S115 to output a signal to the electrically-driven power steering control device 13 so that the steering is vibrated with torque for a preset period to promote turning of the steering to the right, and then processing drops out of the program.

If it is judged in S110 that the X coordinate xw1 of the left end point of the obstacle exists within the alarm area, the processing goes to S116 to judge whether the X coordinate xwr of the right end point of the obstacle exists within the alarm area, that is, whether it is satisfied that $-(\frac{1}{2})\cdot Wh < xwr < (\frac{1}{2})\cdot Wh$.

If as a result of the judgment of S116 the X coordinate xwr of the right end point of the obstacle does not exist within the alarm area, the processing goes to S117 to judge whether the obstacle is an interrupting vehicle. Here, the judgment of the interrupting vehicle is the same as S112.

If as a result of the judgment of S117 the obstacle is judged as an interrupting vehicle, the processing goes to S118 to inform on the liquid crystal monitor 14 that there is an interrupting vehicle from the right (for example, a display indicating invasion of a vehicle from the right is turned on and off) or a voice message "pay attention to interrupting vehicle from right" or the like is generated, and then the processing drops out of the program.

If as a result of the judgment of S117 the obstacle is judged not to be an interrupting vehicle, the processing goes to S119 to give an alarm by making a display indicating "turning of steering to the left" on the liquid crystal monitor 14.

Thereafter, the processing goes to S120 to output a signal to the electrically-driven power steering control device 13, so that the steering is vibrated with torque for a preset period to promote turning of the steering to the left, and then the processing drops out of the program.

If as a result of the judgment of S116 the X coordinate xwr of the right endpoint of the obstacle exists within the alarm area, the processing goes to S121 to judge which one of the right and left the obstacle is displaced to in the alarm area, that is, to execute a judgment as to $|xw1| \geq |xwr|$.

If as a result of the judgment of S121 $|xw1| \geq |xwr|$ is satisfied, the obstacle is judged to exist while displaced to the left and the processing of S112 to S115 is executed. On the other hand, if $|xw1| < |xwr|$, the obstacle is judged to exit while displaced to the right, and the processing of S117 to S120 is executed. Then processing drops out of the program.

Figure 7B:
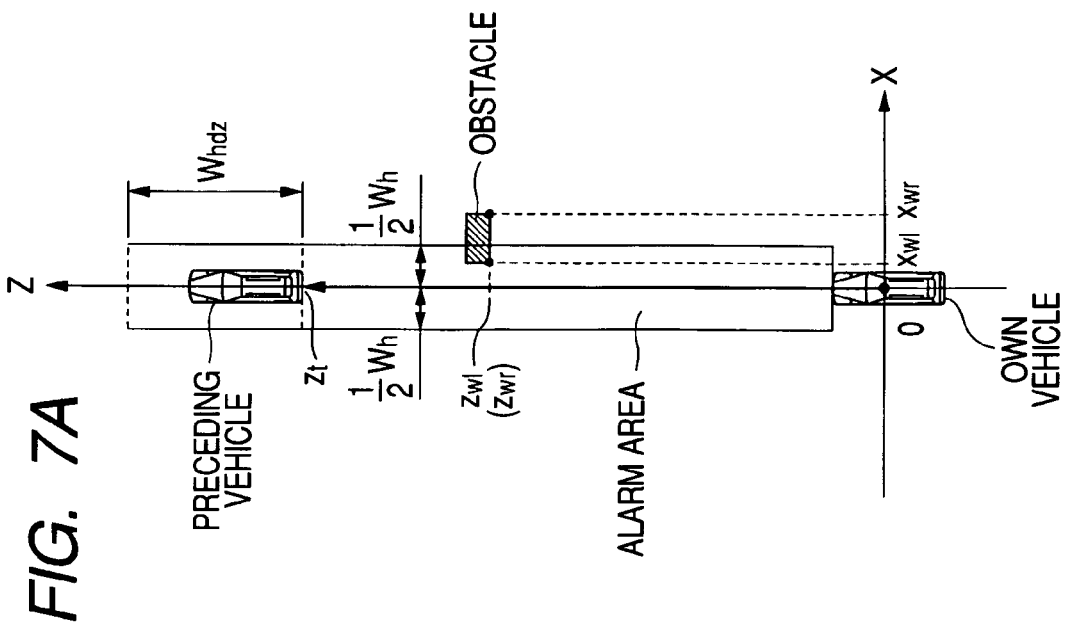

If as a result of the judgment of S109 the target route is a route approximated by an arc as shown in FIG. 7B, the processing goes to S122 to calculate the arc radius Rw1 of the left end point of the obstacle according to the following equation (3):

$$|Rw1|=((Rt-xw1)^2+zw1^2)^{1/2} \quad (3)$$

Subsequently, the processing goes to S123 to calculate the arc radius Rwr of the right endpoint of the obstacle according to the following equation (4):

$$|Rwr|=((Rt-xwr)^2+zwr^2)^{1/2} \quad (4)$$

Then, the processing goes to step S124, it is judged whether the left endpoint of the obstacle exists within the alarm area, that is, whether it is satisfied that $|Rt|-(\frac{1}{2})\cdot Wh < |Rw1| < |Rt|+(\frac{1}{2})\cdot Wh$.

If as a result of this judgment the left end point of the obstacle is judged not to exist within the alarm area, the processing goes to S125 to judge whether the right endpoint of the obstacle exists within the alarm area, that is, whether it is satisfied that $|Rt|-(\frac{1}{2})\cdot Wh < |Rwr| < |Rt|+(\frac{1}{2})\cdot Wh$.

If as a result of the judgment of S125 the right endpoint of the obstacle is judged not to exist within the alarm area, the processing directly drops out of the program.

Furthermore, if as a result of S125 the right end point of the obstacle exists within the alarm area, the processing goes to S126 to judge whether this obstacle is an interrupting vehicle or not. Here, the judgment of the interrupting vehicle is the same as described in S112.

If as a result of the judgment of S126 the obstacle is judged as an interrupting vehicle, the processing goes to S127 to inform on the liquid crystal monitor 14 that there is an interrupting vehicle from the left (for example, a display indicating invasion of a vehicle from the left is turned on and off), or a voice message "pay attention to interrupting vehicle from the left" or the like is generated, and then the processing drops out of the program.

Furthermore, if as a result of the judgment of S126 the obstacle is judged not to be an interrupting vehicle, the processing goes to S128 to give an alarm by making a display indicating turning of the steering to the right on the liquid crystal display monitor 14.

Thereafter, the processing goes to S129 to output a signal to the electrically-driven power steering control device 13 and vibrate the steering with torque for a preset period, thereby promoting the turning of the steering to the right, and then the processing drops out of the program.

If it is judged in S124 that the left end point of the obstacle exists within the alarm area, the processing goes to S130 to judge whether the right endpoint of the obstacle exists within the alarm area, that is, whether it is satisfied that $|Rt|-(1/2)\cdot Wh<|Rwr|<|Rt|+(1/2)\cdot Wh$.

If as a result of the judgment of S130 the right end point of the obstacle is judged not to exist within the alarm area, the processing goes to S131 to judge whether the obstacle is an interrupting vehicle. Here, the judgment of the interrupting vehicle is the same as described in S112.

If as a result of the judgment of S131 the obstacle is judged as an interrupting vehicle, the processing goes to S132 to inform on the liquid crystal monitor 14 that there is an interrupting vehicle from the right (for example, a display indicating invasion of a vehicle from the right is turned on and off), or a voice message "pay attention to interrupting vehicle from the right" or the like is generated, and then the processing drops out of the program.

Furthermore, if as a result of the judgment of S131, the obstacle is judged not to be an interrupting vehicle, the processing goes to S133 to give an alarm by making a display indicating turning of the steering to the left on the liquid crystal display 14.

Thereafter, the processing goes to S134 to output a signal to the electrically-driven power steering control device 13 and vibrate the steering with torque for a preset period, thereby promoting turning of the steering to the left, and then the processing drops out of the program.

Furthermore, if as a result of the judgment of S130 the right end point of the obstacle is judged to exist within the alarm area, the processing goes to S135 to judge whether the obstacle is displaced to the right or the left within the alarm area, that is, a judgment as to whether $|Rt-Rwl| \geq |Rt-Rwr|$ is executed.

If as a result of the judgment of S135 it is judged that $|Rt-Rwl| \geq |Rt-Rwr|$, the obstacle is judged to exist while displaced to the left, and the processing of S126 to S129 is executed. If it is judged that $|Rt-Rwl|<|Rt-Rwr|$, the obstacle is judged to exist while displaced to the right, the processing of S131 to S134 is executed. Then processing drops out of the program.

As described above, according to this embodiment of the present invention, the target route of the own vehicle is calculated in accordance with the present position of the preceding vehicle and the present position of the own vehicle, and the alarm area is set on the basis of the target route. Therefore, the alarm area can be accurately set with excellent timing in accordance with the behavior of the preceding vehicle irrespective of the behavior of the own vehicle and thus alarm control can be performed with high precision.

Furthermore, the target route calculated in accordance with the present position of the preceding vehicle and the present position of the own vehicle is a straight line road or a route approximated by an arc, and it can be easily and quickly set.

Furthermore, the alarm to be set is variably set in accordance with the own vehicle speed, the inter-vehicle distance between the own vehicle and the preceding vehicle, the approach speed of the solid object as a judgment target to the alarm area, and the relative speed between the preceding vehicle and the own vehicle, and thus alarm control adaptive to various kinds of situations can be performed more finely.

The set alarm area is set to extend from the rear end of the preceding vehicle to the front side of the preceding vehicle, and the length of the forward extension is varied in accordance with the own vehicle speed. Therefore, a more proper alarm can be given in accordance with the travel condition of the own vehicle.

Furthermore, the alarm area to be set is restricted by the white line, and it is not set on another travel lane or the like, and alarm control having high precision can be performed.

In this embodiment, the preceding vehicle is recognized on the basis of the images from the stereo camera, however, it may be recognized, for example, on the basis of information from a milli-meter wave radar or a single-eye camera.

What is claimed is:

1. A vehicle surrounding monitoring system comprising:
    a vehicle travel information detecting unit for detecting travel information of an own vehicle;
    a solid object recognizing unit for detecting solid objects existing in front of the own vehicle and recognizing at least a preceding vehicle from the solid objects;
    a target route calculating unit for calculating a target route for the own vehicle in accordance with the present position of the preceding vehicle and the present position of the own vehicle, the target route being calculated for the own vehicle to follow up the preceding vehicle;
    an alarm area setting unit for setting an alarm area along the target route; and
    an alarm control unit for giving an alarm in accordance with an existing state of solid objects existing in the alarm area.

2. The vehicle surrounding monitoring system according to claim 1, wherein the target route calculated by the target route calculating unit is set to any one of a straight line and a route approximated by an arc.

3. The vehicle surrounding monitoring system according to claim 2, wherein when in a coordinate system including the position of the own vehicle as an origin, the center-of-gravity position of the preceding vehicle is not displaced in the lateral direction with respect to the origin, the target route calculating unit sets the route to a straight line.

4. The vehicle surrounding monitoring system according to claim 2, wherein when the radius of the route approximated by the calculated arc is larger than a set value, the target route calculating unit sets the route to a straight line.

5. The vehicle surrounding monitoring system according to claim 1, wherein the width of the alarm area set by the alarm area setting unit is variably set in accordance with at least one of the speed of the own vehicle, the inter-vehicle distance between the own vehicle and the preceding vehicle, an approach speed of a solid object as a judgment target to the alarm area, and the relative speed between the preceding vehicle and the own vehicle.

6. The vehicle surrounding monitoring system according to claim 1, wherein the alarm area set by the alarm area setting unit is set to extend forward from the rear end of the preceding vehicle.

7. The vehicle surrounding monitoring system according to claim 6, wherein the forward extension length of the alarm area from the rear end of the preceding vehicle is variable in accordance with the speed of the own vehicle.

8. The vehicle surrounding monitoring system according to claim 1, wherein when a white line of a travel road exists in the alarm area, the alarm area set by the alarm area setting unit restricts the alarm area by the white line.

9. The vehicle surrounding monitoring system according to claim 1, wherein when a solid object exists at the right side in the alarm area, the alarm control unit gives an alarm to promote turning of steering to the left, and when the solid object exists at the left side in the alarm area, the alarm control unit gives an alarm to promote turning of steering to the right.

10. The vehicle surrounding monitoring system according to claim 1, wherein when the speed of a solid object as an alarm target is substantially equal to that of the preceding vehicle and also the solid object as the alarm target has a preset width which is regarded as a vehicle, the alarm control unit switches the alarm to any one of prohibition of the alarm and a notification indicating an interrupting vehicle.

* * * * *